Figure 1:
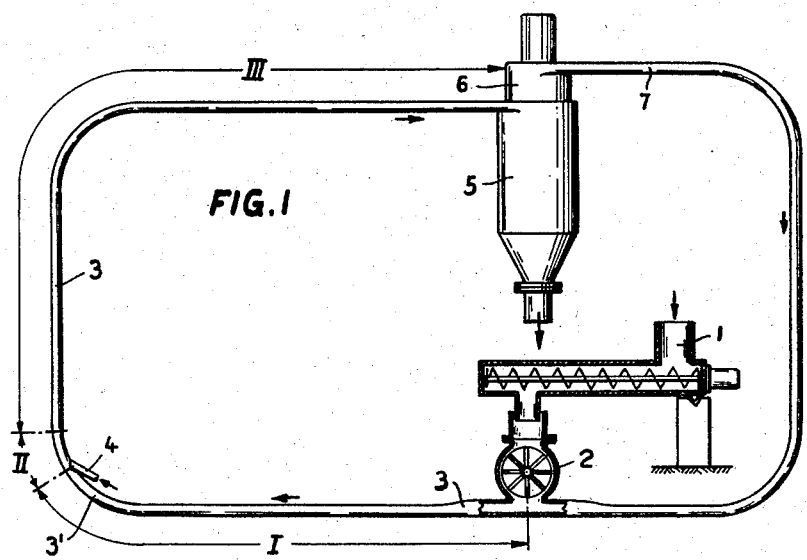

March 31, 1959   W. KUHLMANN ET AL   2,880,093
PROCESS AND APPARATUS FOR IMPROVING THE
BAKING PROPERTIES OF WHEAT FLOUR
Filed Jan. 11, 1954   2 Sheets-Sheet 2

— — a = 199 cm²
——— b = 198 cm²
—·— c = 273 cm²

Inventors.
Wilhelm Kuhlmann,
Bernd Pagenstedt, &
Carl W. Brabender.

By
Atty.

though of arranging the inner wall with a substrate profile of the same kind of material as the flour particles. The injection of the steam into the first turn of the conveyor duct may be effected, for example, by means of a steam jet directed in the direction of flow or by means of several steam jets distributed about the cross-section of the duct. The relative air humidity is measured by known devices arranged before the entry of the milling product into the conveyor duct and at the end of the last third of the first duct turn. By known suitable means, the relative air humidity is maintained at the values prescribed by the process at the places referred to.

2,880,093

PROCESS AND APPARATUS FOR IMPROVING THE BAKING PROPERTIES OF WHEAT FLOUR

Wilhelm Kuhlmann and Bernd Pagenstedt, Duisburg, Germany, and Carl W. Brabender, Wayzata, Minn.

Application January 11, 1954, Serial No. 403,374

Claims priority, application Germany January 13, 1953

6 Claims. (Cl. 99—93)

The invention relates to a process and apparatus for improving the baking properties of the products of milling bread grain. It has long been known that the baking quality of products of milling bread grain, especially of wheat flour, the dough of which may easily be overstretched, can be improved by a heat treatment. The improvement of the baking quality by known heating methods is substantially to be attributed, in the case of wheat flour, to a hardening of the wheat gluten, which is caused by a more or less strong coagulation of the protein contained in the flour.

Fisher and Jones subjected flour, in a pneumatic air-circulation installation, to the action of hot, moist and moving air, the duration of the action only amounting to seconds. It appeared that the milled product treated in this manner, especially in the case of wheat flour, is discoloured, and the device used for carrying out the process is constantly clogged by products of milling and paste. The deposits of milling product and paste are especially great when the treatment is carried out at high temperature and high relative air humidity, and condensations leading to the formation of paste occur especially where the milling product comes into contact with the hot air, that is to say, at the point where the milling product is charged into the device.

The process according to the invention is also based on the treatment of the products of milling bread grain with hot, moist and moving air, but in contrast to the known processes, the milling product is not subjected to the action of flowing air having a constant temperature and relative air humidity; on the contrary the heat treatment according to the invention is completed in three zones, in which temperature and humidity have values differing by far from one another. The heat treatment, which is completed within fractions of seconds, for example, within 0.5 to 0.6 sec., is followed, in a fourth zone, by a sudden cooling down of the milling product to room temperature. It is further characteristic of the process according to the invention that the change of temperature and humidity takes place suddenly.

The process according to the invention provides for subjecting the milling product to the action of flowing air under pressure and having a relative humidity lying within the range from 60–90%, preferably within the range from 70–80%, and a temperature of 80° C. at the maximum, preferably a temperature lying within the range from 45° to 50° C., so as to charge the product with moisture and to heat it to a temperature lying within the range from 40° C. to 45° C., in periods of fractions of seconds, thereupon suddenly subjecting the product, in the air current under pressure, to the action of saturated steam or superheated steam, that is, subjecting the product to great heat, the product remaining in the air current until it has assumed a temperature lying within the range from 45° C. to 75° C., preferably about 60° C., whereupon the product is removed from the air current and is suddenly cooled to room temperature.

A known pneumatic conveyer operating in a cycle, the conveyer duct of which and also the return air duct of which are under increased pressure, is especially suitable for carrying out the process according to the invention. In such a conveyer, the return air duct will not clog due to condensation and flour dust.

The cooling down of the heated milled product charged with moisture may be effected in an additional pneumatic conveyer, in which the product is cooled down suddenly to room temperature by means of cold air.

The heating of the air, serving in known manner as heat carrier, is effected for example, by heating the conveying and return air duct as well as the device serving for charging the milling product into the conveyor duct, by means of known and suitable electrical resistance heating arrangement, which in turn is controlled by known and suitable temperature-regulating means. The ducts and the charging device may also be heated by steam or hot water circulating through jacket chambers formed by double-walls provided therefor. In order to avoid condensation, it is advisable to heat the charging device to a somewhat higher temperature than the conveyor and return air ducts.

All expedients which are operative to increase the heat transmission to the milled product will improve the effect of the heat treatment.

It is for this reason advisable to line with copper the inner walls of the duct turns with which the milling product is in especially intimate contact during the conveying under pressure.

In accordance with the invention, the milling product is charged into the conveyor duct from above by means of a charging valve with a star wheel having very thin webs, in order to reduce the contact surface between the webs and the corresponding casing to a minimum. The webs may be made, for example, from sheet steel 1 mm. thick. The star wheel is further so arranged that the milling product is immediately discharged into and taken up by the air current in the conveyor duct. The milling product may also be charged into the conveyor duct by means of a horizontally disposed screw conveyor arranged laterally of the conveyor duct. It is advantageous to provide for a cushion of flour between the end of the screw and the entry into the conveyor duct, such cushion serving as air lock against the conveyor duct, which is under increased pressure.

In order to maintain a predetermined relationship between quantity of flour charged in per unit of time and quantity of steam injected per unit of time, the quantity of steam necessary for the treatment of the milling product is controlled in accordance with the invention by means of a steam supply regulating valve, which is coupled with a feed screw forming a weigher beam, arranged above the star wheel charging valve, through which the milling product is charged into the duct, and which releases more or less steam for the treatment, according to the inclination of the weigher beam, due to the quantity of milled material fed therethrough. The quantity of steam may also be controlled by means of a pressure-regulating valve connected with the conveyor duct and responding to the pressure obtaining therein, such pressure increasing linearly with the quantity of milling product conveyed per unit of time. Thus, the greater the quantity of flour conveyed, the more steam is injected, and vice versa.

The injection of saturated steam or super-heated steam according to the invention takes place in the last third of the first tube turn of the conveyor duct. The reason for this measure is that in a tube turn the flour particles are compressed towards the outer wall of the curved section, and when the steam is injected into the last third of the curved section, contact between flour and steam takes place in the free space of the tube duct at the end of the curved section, or at the beginning of the vertical tube duct, so that no deposits of flour paste can occur on the tube walls.

Figure 2:
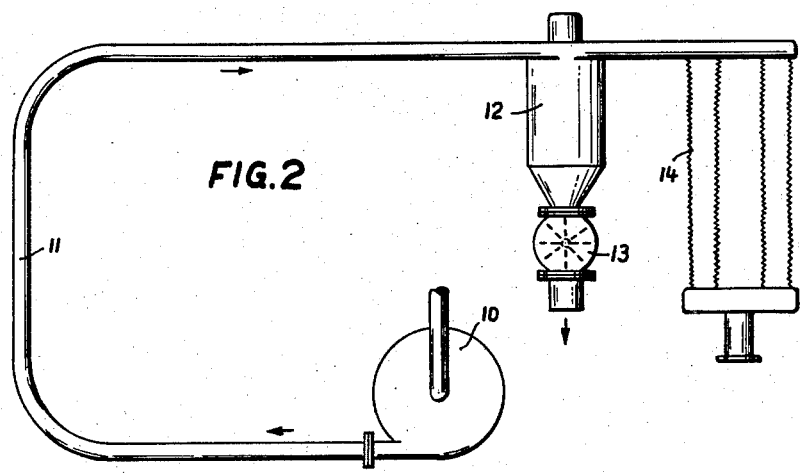
Figure 3:
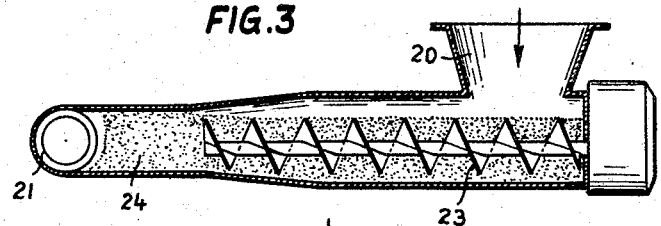
Figure 4:
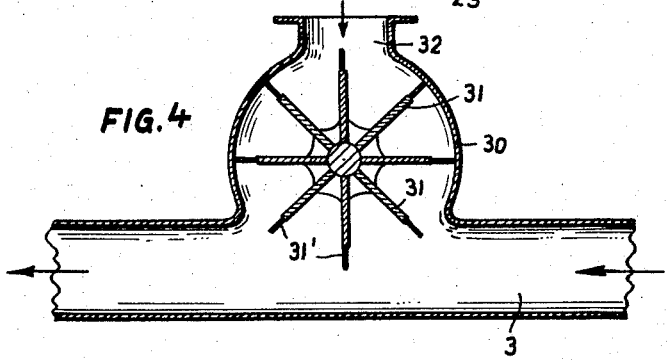
Figure 5:
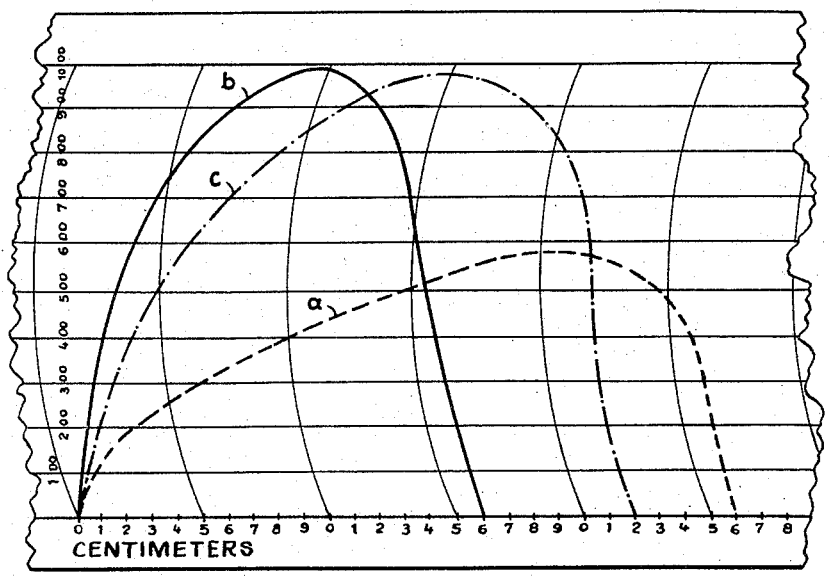

The invention will now be described with reference to the accompanying diagrammatic drawings in which:

Fig. 1 shows a flow diagram;
Fig. 2 shows an example of a pneumatic circulating plant according to the invention;
Figs. 3 and 4 indicate charging devices; and
Fig. 5 shows curves to illustrate the improvement resulting from the invention.

The flow diagram shown in Figure 1 is based on a pneumatic conveyor with an air delivery of 2.4 cu. meters per minute. If there is a travel path of about 6 meters and an internal tube diameter of 6 cm., the air speed, and thus the speed of conveying of the flour particles, and the duration of treatment, for the 6 meter long conveyor duct from the flour charging point to the separator amounts to about 0.5 second.

The milling product to be treated, with a moisture content of, for example, 15%, is introduced, by means of a weigher beam 1, which at the same time regulates the quantity of steam necessary for the treatment of the milling product, through a heated star wheel charging valve 2 into the conveyor duct 3. In the conveyor duct, the heat treatment, lasting 0.5 second, is effected in three zones I, II, and III. Zone I extends from the point of entry of the flour into the conveyor duct to almost the end of the first tube turn 3'; zone II extends approximately to the last third of the first tube turn 3', and zone III extends from the end of this tube turn to the point where the milling product emerges again from the conveyor duct.

In zone I, the milled material is pre-heated in an air current of for example 50° C. and 75% relative air humidity, to 45° C., at the same time the moisture content of the milling product rising at the same time to 15.5 to 16% within 0.17 second. This operation takes place over a conveying path of about 2 meters.

In zone II, the preheated flour, charged with moisture, is suddenly subjected to saturated steam of for example 100° C. and 95% relative air humidity, injected at 4 into the last third of the tube turn 3'. This zone is about 0.2 meters long, the milling product flowing therethrough within 0.02 second. The surface temperature of the particles of the milling product rises for a fraction of a second to about 80 to 90° C., and the moisture content of the milling product increases at the same time to 16 to 17%.

Zone III extends along a conveying path of about 3.8 meters, through which the milling product passes in 0.31 second.

In zone III, the milling product is cooled down again, and the moisture released due to the condensation occurring is partly absorbed by the milling prdouct and partly by the air.

The milling product enters the separator 5, the separator being arranged beneath the blower 6, with a temperature of about 60° C. and a moisture content of about 16 to 17%. The separator 5 separates the milling product from the air stream flowing in the conveyor duct, such air stream substantially free of the milling product returning under pressure into the cycle through the return duct 7.

For the purpose of suddenly cooling the milling product leaving the separator 5, such product enters the pneumatic device illustrated diagrammatically in Figure 2, comprising a conveyor blower 10, conveyor duct 11, separator 12 and pressure filter 14. The heated milling product passes with air through the blower 10 into the conveyor duct 11, and thence into the separator 12. The milled material cooled down to about 25° C. and charged with a water content of 15–15.5% leaves the separator 12 through the star wheel discharge valve 13.

The air passes into the pressure filter 14, for the separation of the remaining quantity of milling product.

In Figures 3 and 4 of the drawing, devices are illustrated diagrammatically which serve for the charging of the milled product into the conveying duct of the air circulation plant.

According to Figure 3, the charging device comprises a conveyor screw. The milled product enters the charging device through the hopper 20, and leaves the latter through the nozzle 21, which passes to the conveying duct 3. As may be seen from the drawing, a space 24 is left between the end of the conveyor screw 23 and the nozzle 21, which space is filled with milled material, forming an air seal, whereby the conveying duct 3, which is under increased pressure, is sealed off to the outside.

The charging device according to Figure 4 comprises a star wheel 31 arranged in a housing 30, and extending into the conveying duct 3. The milled material is fed into the charging device through the opening 32. As may further be seen from the drawing, webs 31' preferably formed by 1 mm. thick sheet steel, are mounted on the blades of the star wheel 31. The material passes from the charging valve directly into the conveyor duct 3, in which it is taken up by the air current.

The milled product treated in accordance with the invention experiences an unexpected improvement in its baking quality, which appears from the diagram shown in Figure 5.

Three curves $a$, $b$ and $c$ are entered in the diagram, these curves being obtained with the aid of a known instrument for measuring the elasticity of dough (extensograph), from dough made of untreated wheat flour, dough from wheat flour subjected in a known manner to the action of hot moist air, and dough from wheat flour treated in accordance with the process according to the invention.

The curve $a$ (dough from untreated wheat flour) shows a total strength of 199 sq. cm. This curve as compared with curves $b$ and $c$ is relatively long and low, indicating that the dough made of untreated flour has great stretchability but low stretching resistance. The dough inclines to flow. The baker knows from the curve that the corresponding dough will result in flat baked products. Curve $b$ (dough from wheat flour subjected to known treatment) shows a dough strength of 198 sq. cm. The height of the curve as compared with that of curve $a$ shows that the corresponding dough has a great stretch resistance and the shortness of the curve indicates that the stretchability (elasticity) is very low. The dough is too firm and results in small spherical baking products, that is, products with small volume. Curve $c$ (obtained by using dough made from wheat flour treated according to the invention) exhibits a strength of 273 sq. cm. The curves show that in the case of dough made from flour treated in known manner for the improvement of the baking qualities (curve $b$), the dough strength is maintained and only the ratio of stretch resistance to stretchability of the dough is shifted, while dough treated in accordance with the invention (curve $c$) exhibits a considerable increase in the dough strength. In other words, the dough $c$ has not only the stretch resistance of the dough $b$ but also exhibits the desired stretchability (elasticity) required for producing baked products with maximum volume.

Accordingly, a reinforcement of the total dough strength is achieved in accordance with the process according to the invention, such as was hitherto only possible with the aid of a so-called booster wheat.

The effects obtained by the invention may be explained by an extraordinary strong displacement of the redox-potential of the protein gluten-lipoid complex towards the oxidation side.

A further advantage of the process according to the invention resides in largely reducing the stickiness of the doughs produced from the treated milling products, especially in the case of milling products of the low-grade flours.

Since the heat only comes into effect suddenly, in accordance with the process according to the invention, the colour of the milling product treated is not changed, and for the same reason oxidation, and imparing of the provitamin A complex and of the vitamin B complex cannot occur. Furthermore the formation of toxic protein compounds, harmful to the health of animals and human beings, is not possible.

Changes may be made within the scope and spirit of the appended claims.

What we claim is:

1. A process for improving the baking qualities of wheat flour comprising conveying wheat flour in a pressurized air current moving at relatively high velocity, preheating said flour moving in said air current within an interval on the order of fractions of a second to a temperature lying within the range from about 40° C. to about 45° C., and simultaneously charging it with moisture, suddenly subjecting said preheated and moisturized flour moving in said air current to the action of superheated steam at a relative humidity on the order of about 95% to raise the surface temperature of the flour particle for fractions of a second to a temperature lying within the range from about 80° C. to about 90° C., moving said flour in said air current until the particles thereof assume a temperature lying within the range from about 45° C. to about 75° C., and thereafter removing said wheat flour from said air stream and suddenly cooling it down to room temperature.

2. A process according to claim 1, wherein the moisture content of said wheat flour rises during the preheating thereof to about 15.5% to 16% within about 0.17 second.

3. A process according to claim 2, wherein the moisture content of said wheat flour rises to about 16% to 17% responsive to said steam action within about 0.02 second.

4. A process according to claim 3, wherein the decrease of temperature of said wheat flour to about 45° C. to 75° C. is effected within about 0.31 second.

5. Apparatus for treating wheat flour to improve its baking qualities comprising tubular means forming a closed conveying path, means for propelling along said path air under pressure at relatively high velocity, charging means for injecting wheat flour into said moving air current at a predetermined charging point thereof, means for imparting heat to a predetermined first section of said path to preheat the flour moving therealong with said air current for fractions of a second to a temperature lying within the range from about 40° C. to about 45° C. and for simultaneously moistening said wheat flour in said first section, means for injecting superheated steam at relative humidity on the order of about 95% into said conveying path at a predetermined point of a second section following said first section to raise the temperature of said wheat flour for fractions of a second to a temperature lying within the range from about 80° C. to 90° C., means for separating said wheat flour from said path at a point thereof at which the wheat flour exhibits a temperature lying within the range from about 45° C. to 75° C., and means for thereafter suddenly cooling said wheat flour to room temperature.

6. Apparatus according to claim 5, comprising means forming a copper lining in said tubular path at the point of injection of steam thereinto for increasing heat transmission to said wheat flour at said second section of the tubular path.

References Cited in the file of this patent

UNITED STATES PATENTS

| 1,167,956 | Walker | Jan. 11, 1916 |

FOREIGN PATENTS

| 300,537 | Great Britain | Nov. 12, 1928 |
| 310,125 | Great Britain | Apr. 25, 1929 |
| 285,038 | Great Britain | May 9, 1929 |

OTHER REFERENCES

Kent-Jones et. al.: Modern Cereal Chemistry, 1947, 4th ed., Northern Publishing Co., Ltd. (Liverpool), pp. 436–438 relied on.

Kent-Jones et al.: Modern Cereal Chemistry, 1947, 4th ed., Northern Publishing Co., Ltd. (Liverpool), pp. 159, 253–256.